United States Patent [19]

Pearce

[11] Patent Number: 5,226,205
[45] Date of Patent: Jul. 13, 1993

[54] HYDRAULIC MACHINE

[75] Inventor: Ronald J. Pearce, Roodepoort, South Africa

[73] Assignee: Fred International C.V., Zurich, Switzerland

[21] Appl. No.: 757,619

[22] Filed: Sep. 11, 1991

[30] Foreign Application Priority Data

Sep. 11, 1990 [ZA] South Africa .................. 90/7209

[51] Int. Cl.⁵ .................................................. E04H 3/20
[52] U.S. Cl. ...................................................... 15/1.7
[58] Field of Search ........................................... 15/1.7

[56] References Cited

U.S. PATENT DOCUMENTS

| 3,392,738 | 7/1968 | Pansini | 15/1.7 |
|---|---|---|---|
| 3,471,884 | 10/1969 | Wright | 15/1.7 |
| 3,481,250 | 12/1969 | Toby | 91/232 |
| 3,790,979 | 2/1974 | Foster | 15/1.7 |
| 3,805,815 | 4/1974 | Goodwin | 15/1.7 |
| 4,023,227 | 5/1977 | Chauvier | 15/1.7 |
| 4,133,068 | 4/1979 | Hofmann | 15/1.7 |
| 4,208,752 | 6/1980 | Hofmann | 15/1.7 |
| 4,351,077 | 9/1982 | Hofmann | 15/1.7 |
| 4,536,908 | 8/1985 | Raubenheimer | 15/1.7 |

FOREIGN PATENT DOCUMENTS

| 0205697 | 12/1986 | European Pat. Off. . | |
|---|---|---|---|
| 2520420 | 7/1983 | France | 15/1.7 |
| 2520422 | 7/1983 | France | 15/1.7 |
| 2604351 | 4/1988 | France . | |
| 2153661 | 8/1985 | United Kingdom . | |
| 2194727 | 3/1988 | United Kingdom . | |

Primary Examiner—Edward L. Roberts
Attorney, Agent, or Firm—Kilpatrick & Cody

[57] ABSTRACT

The invention concerns an hydraulic machine, typically a submerged surface cleaner which comprises a body having a liquid inlet and a liquid outlet and a conduit extending between the inlet and the outlet. A drive element is supported in or adjacent to the conduit, with a clearance between the drive element and the interior of the conduit, in a manner permitting eccentric location and rotation of the drive element relative to the conduit. The conduit can be connected in a liquid flow path so that liquid passing through the conduit past the drive element, when the drive element is positioned eccentrically relative to the conduit, applies differential forces to the drive element to cause it to rotate relative the conduit. The rotation of the drive element is used directly or indirectly to drive the cleaner over a submerged surface.

21 Claims, 5 Drawing Sheets

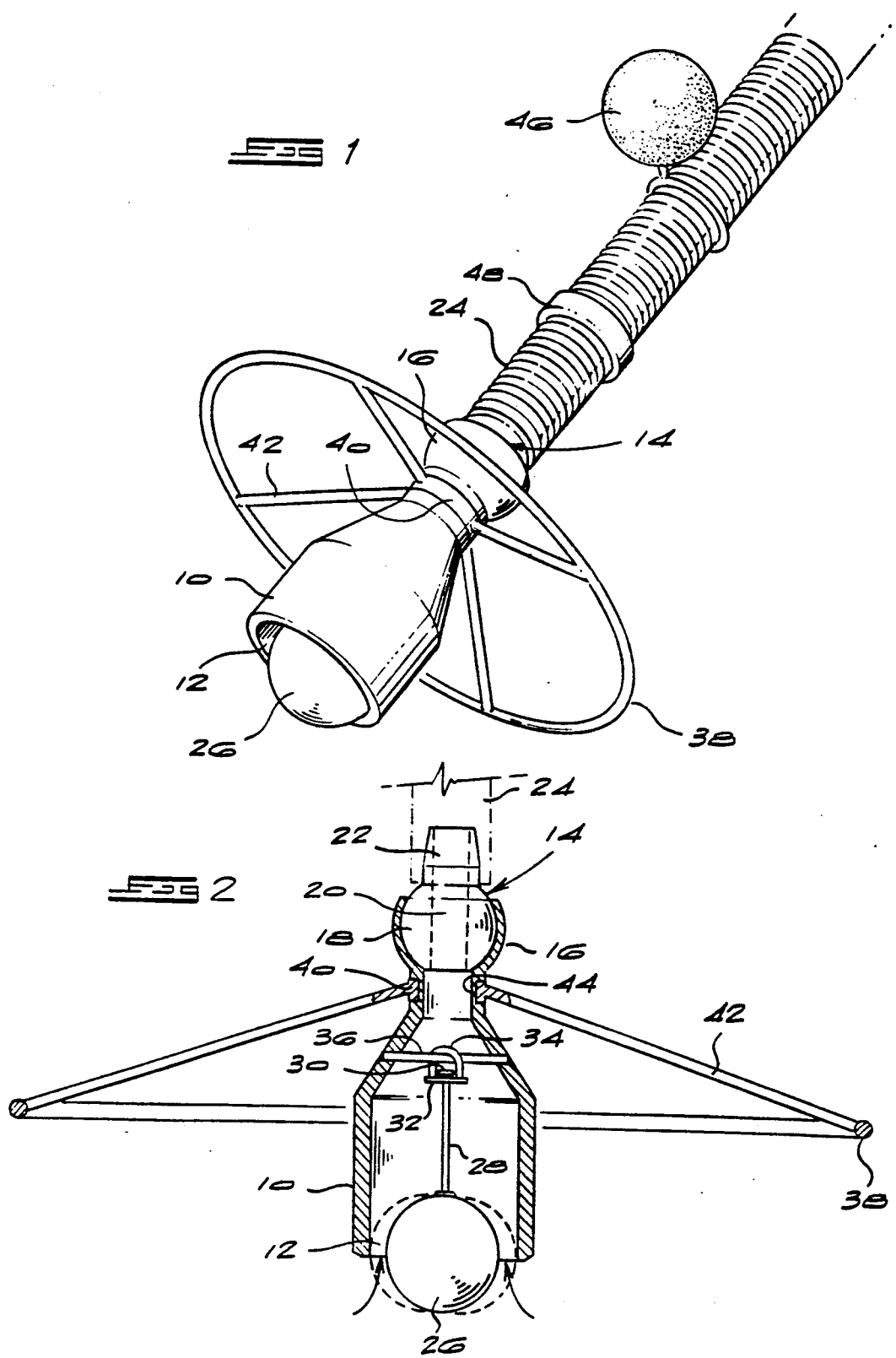

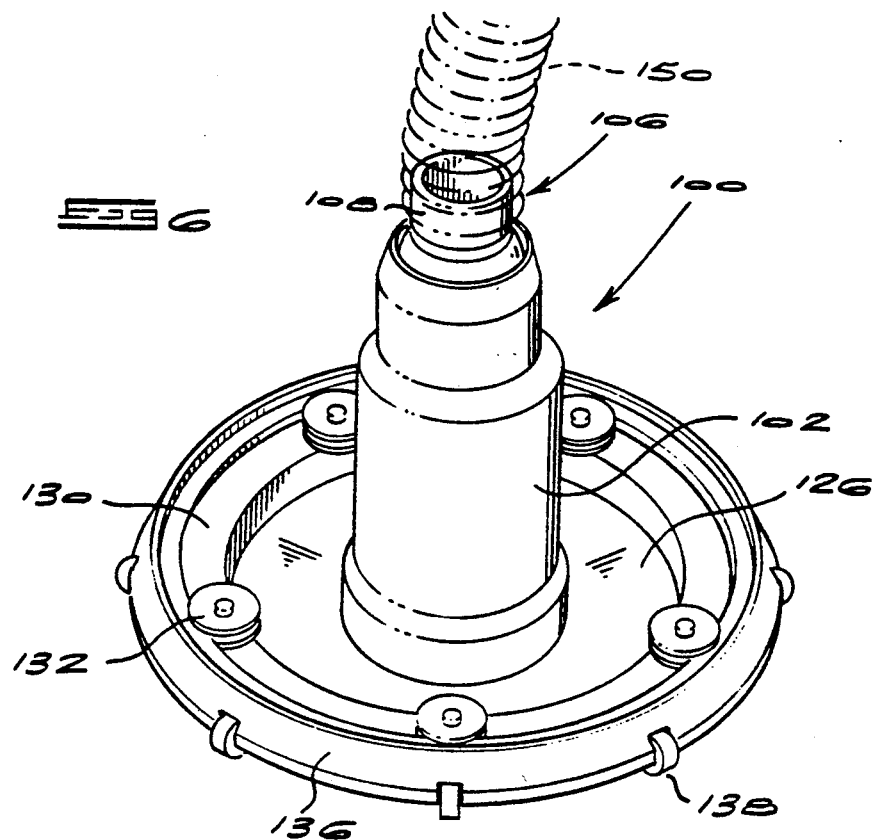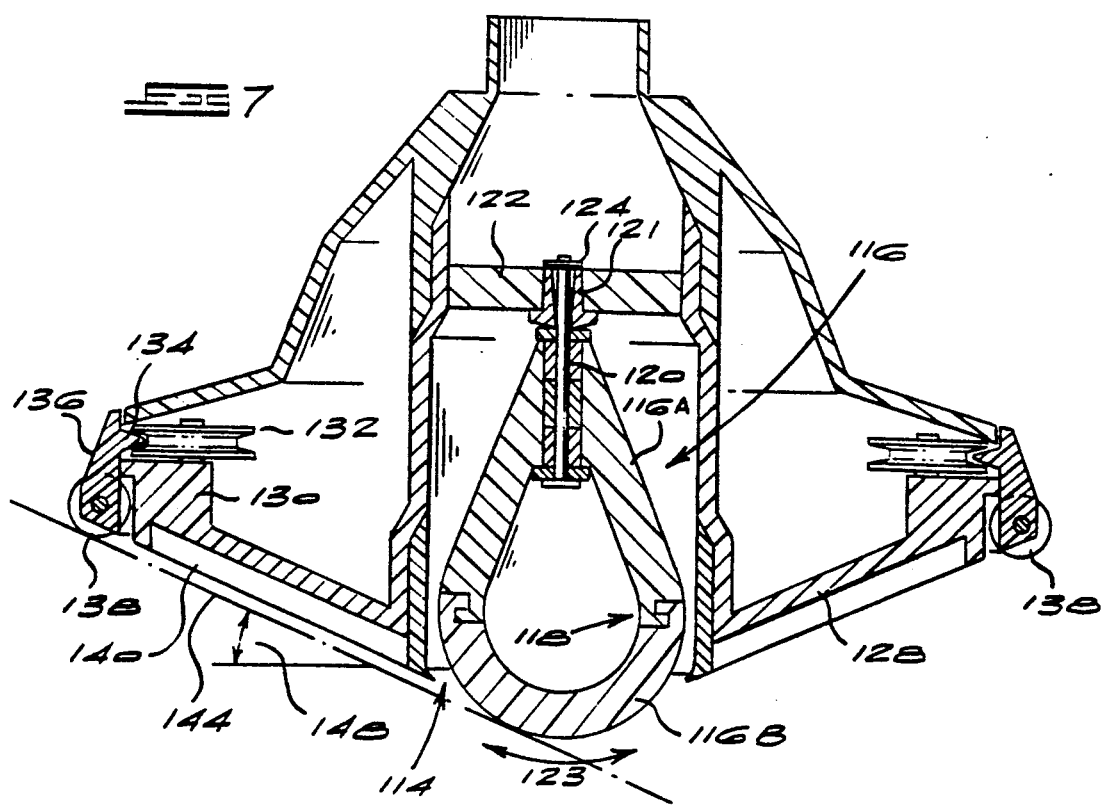

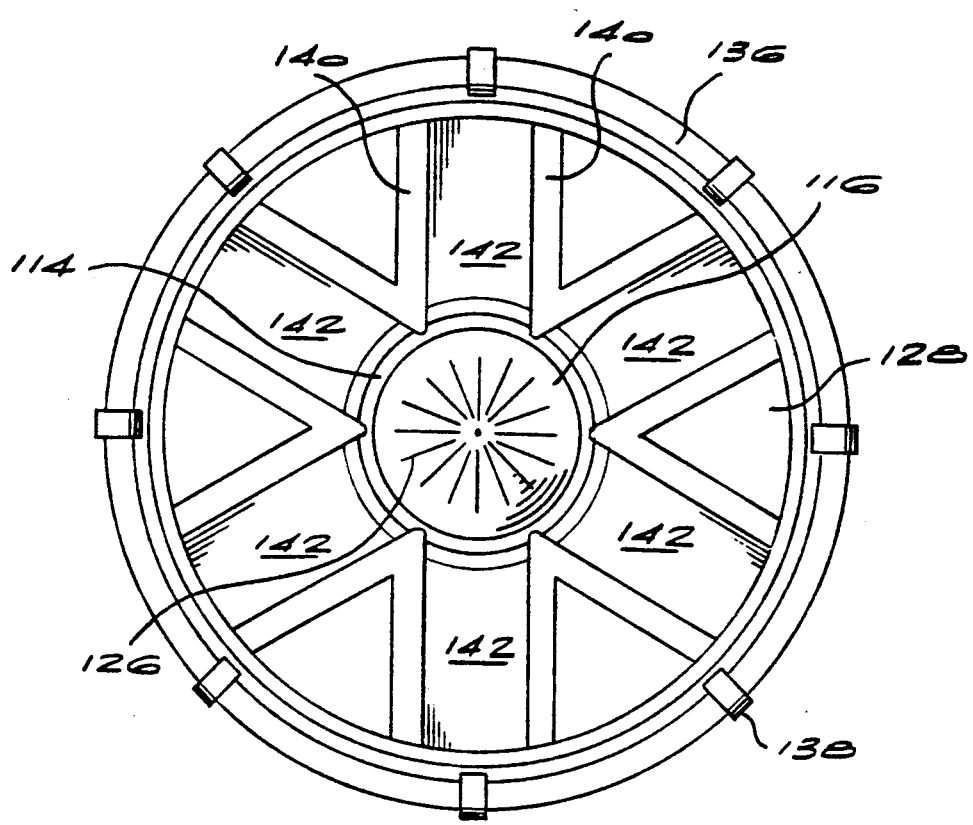

HYDRAULIC MACHINE

BACKGROUND OF THE INVENTION

This invention relates to an hydraulic machine. In one application, the invention relates to a cleaner for cleaning a submerged surface, such as the submerged portion of a swimming pool.

Numerous swimming pool cleaners have been proposed, which fall into two main categories. The first category includes pool cleaners which use an oscillating valve element such as a "hammer" valve or a flexible diaphragm which alternately constricts and relaxes, to interrupt a flow of liquid through the pool cleaner repetitively, thus developing forces which propel the pool cleaner in one direction or another. The second category of pool cleaners includes those which employ a turbine or the like which is operated by a flow of water through the pool cleaner, the turbine in turn driving feet, wheels, tracks or another drive mechanism. Generally speaking, although pool cleaners in the first category are mechanically simple, they tend to impose a greater amount of stress on the pool filtration unit and pump due to the repetitive shock waves generated by their action. Pool cleaners of the second category do not produce such shock waves, but tend to be more complicated mechanically than those in the first category.

SUMMARY OF THE INVENTION

A first aspect of the invention provides an hydraulic machine comprising:
a) a body having a liquid inlet and a liquid outlet and a conduit extending between the inlet and the outlet, and
b) a drive element supported in or adjacent to the conduit, with a clearance between the drive element and the interior of the conduit, in a manner permitting variable eccentric location and rotation of the drive element relative to the conduit,
the conduit being connectable in a liquid flow path so that liquid passing through the conduit past the drive element, when the drive element is positioned eccentrically relative to the conduit, applies differential forces to the drive element resulting in rotation of the drive element relative to the inlet.

The liquid outlet is adapted for connection to a suction source which draws liquid through the inlet, past the drive element and out of the outlet.

Preferably, the liquid outlet is provided with a swivel connector for connecting it to a hose extending to the suction source.

The drive element may be a ball, cylinder or other suitably shaped body. In the preferred versions of the invention, the drive element is a spherical or pear-shaped ball, and the drive element and conduit have a circular cross-section. Typically, the drive element is smaller in diameter than the conduit and is disposed at least partially within the conduit. Alternatively, the drive element is larger in diameter than the conduit and is disposed adjacent the conduit.

In one form of the hydraulic machine, which operates as a cleaner for submerged surfaces, at least a portion of the drive element extends beyond the conduit so as to engage the submerged surface frictionally and so as to drive the body over the submerged surface as the drive element rotates. In this case, the cleaner comprises a support structure extending transversely from the body which in use engages the submerged surface and prevents edges of the liquid inlet from dragging over the submerged surface as the body moves over that surface. The support structure may be of frustoconical shape and the periphery of the support structure may carry a ring which is rotatable relative to the support structure. Typically, the ring is supported relative to the support structure by rotatable wheels carried by the periphery of the support structure.

In some cases, an annular support ring may surround the body and be connected to the body by a spoked hub.

In another form of the invention, the drive element acts as a prime mover and is connected via transmission means to a secondary drive element which in use engages a submerged surface and drives the cleaner over the submerged surface when the drive element, acting as a prime mover, rotates.

A second aspect of the invention provides a method of driving a submerged surface cleaner over a submerged surface which is to be cleaned, the method comprising the steps of disposing a drive element with clearance in or adjacent a conduit in a manner to allow the drive element to rotate relative to the conduit and to assume positions which are eccentric relative to the conduit, connecting the conduit in a liquid flow path so that liquid flowing through the conduit flows past the drive element and applies differential forces to the drive element, when the drive element is positioned eccentrically relative to the conduit, which results in rotation of the drive element relative to the conduit, and using the rotation of the drive element to move the cleaner over the submerged surface.

BRIEF DESCRIPTION OF THE DRAWINGS

The invention will now be described in more detail, by way of example only, with reference to the accompanying drawings in which:

FIG. 1 is a pictorial view of a cleaner for cleaning a submerged surface according to the invention;

FIG. 2 is a partial sectional view of the cleaner of FIG. 1;

FIG. 6 is a pictorial view of a further embodiment of the invention;

FIG. 7 is a cross-sectional view of the embodiment of FIG. 6; and

FIG. 8 is an underplan view of the embodiment of FIGS. 6 and 7.

DESCRIPTION OF EMBODIMENTS

Figure 3:
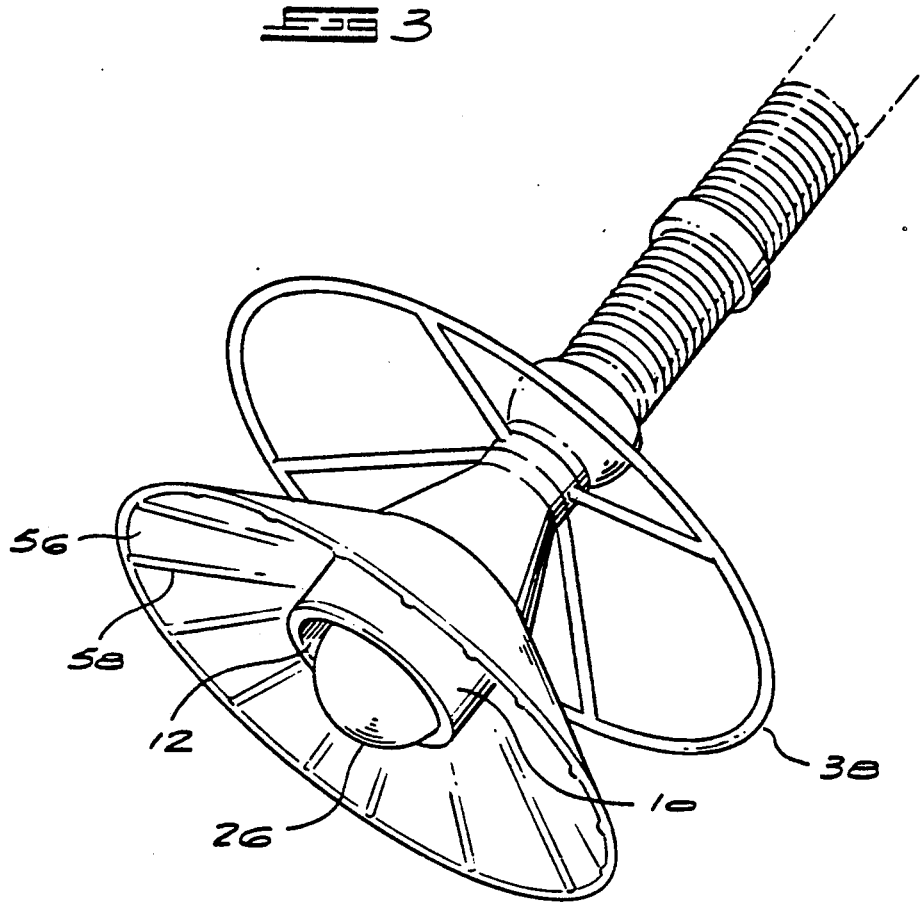
FIG. 3 is a pictorial view of the cleaner of FIG. 1 fitted with a flexible cowl.

The pool cleaner illustrated in FIGS. 1 and 2 comprises a body 10 which is round cylindrical at a first end which defines an inlet 12 having a circular cross-section. The body narrows towards an outlet 14 defining a socket 16 in which a ball 18 (see FIG. 2) is receivable. The ball 18 has a bore 20 formed therein and has a spigot 22 on one side which engages a flexible hose 24. Thus, the ball 18 and the socket 16 define a flexible joint which allows liquid to be sucked through the inlet 12 of the body, through the conduit defined by the hollow interior of the body, and out of the outlet 14 into the hose 24. The hose is connected, in a conventional manner, to a pool filtration system in use.

Supported within the body 10 is a drive element in the form of a resilient ball 26. The ball 26 is made, for example, of a dense, resilient foam plastics material having a rough surface. The ball 26 is fixed to a shaft 28 which has an enlarged head 30 and is held captive by a plate 32 having a hole therein through which the head 30 cannot pass. However, the shaft 28 and thus the ball 26 can rotate freely about the axis of the shaft 28. The plate 32 is secured to the legs of a U-shaped bracket 34 which is supported loosely by a transverse rod 36 fixed at each end to the sides of the body 10. Thus, it will be apparent that the ball 26 is not only rotatable freely about the axis of the shaft 28, but can also move transversely in the inlet, as indicated by the dotted lines in FIG. 2, thus varying the clearance between the ball 26 and the inner edges of the inlet.

A support structure in the form of a support ring 38 with an inner hub 40 and radial spokes 42 is received in a circumferential groove 44 formed in the narrow portion of the body 10, and is freely rotatable relative to the body. The support ring 38 extends transversely away from the body sufficiently far so that when both it and the ball 26 rest against the submerged surface to be cleaned, the edges of the inlet 12 are clear of the surface, preventing dragging.

As shown in FIG. 1, a float 46 and a weight 48 are attached to the flexible hose 24. The relative positions of the weight and the float can be adjusted to vary the behaviour of the cleaner in use.

In operation, water is drawn into the inlet 12 of the cleaner, past the ball 26. Depending on the lateral orientation of the ball 26 in the inlet, the flow of water past the surface of the ball causes it to move in the inlet. The net result is that the ball is caused to rotate about the axis of the shaft 28, in one direction or the other. With the ball 26 resting on the submerged surface to be cleaned, and assuming that the cleaner is not standing at exactly 90° to the surface, this imparts an arcuate motion to the pool cleaner across the surface. As the cleaner moves, the orientation of the hose 24 will change, which tends to change the attitude of the pool cleaner relative to the surface. This causes the ball 26 to move orbitally within the inlet, i.e. its eccentricity within the inlet varies. This in turn changes the forces on the ball and varies the path taken by the pool cleaner. It will thus be apparent that the very simple mechanism described can cause substantially random motion of the pool cleaner over the surface to be cleaned.

Assuming that the ball 26 is not disposed absolutely centrally within the inlet 12, liquid flowing past the ball will have different speed at different points around the equator of the ball, and will thus exert unequal forces on different portions of the ball, giving rise to the motion described above. It is believed that the rotational movement of the ball in the inlet is attributable to differential forces acting directly on the ball that cause it to spin, or to sideways movement of the ball against the side of the inlet that give rise to a rotational drive on the ball.

By ballasting the described device appropriately, adequate contact between the driving ball 26 and the surface to be cleaned can be ensured. The amount of ballast employed also affects the ability of the cleaner to climb the walls of a pool in use. The material used for the driving ball 26 also has an effect on the behaviour of the cleaner.

It is not essential that the drive element used by the pool cleaner be a ball. It is possible that a hemispherical drive element, or a cylindrical element having a rounded end could be used. Although a smooth drive element such as the ball 26 illustrated provides sufficient torque to move the pool cleaner about satisfactorily, the drive element can be provided with flutes or vanes, for example, to increase the torque available. Instead, a vane could be fitted to the rod 28 to ensure starting of the rotation in a desired direction. This would preclude the desirable bidirectional rotation which is achieved with a smooth drive element. In some applications, however, it may be desirable to predetermine the direction of rotation of the drive element.

Instead of the rigid rod 28 which is used to support the ball 26 in the inlet 12, other support means can be used. For example, a flexible rod can be fixed to the interior of the body 10 (or even formed integrally therewith) with the ball being mounted rotatably on the end of the rod. The material and thickness of the rod can be selected to be sufficiently "whippy" to provide the desired freedom of movement of the ball within the inlet, without the complication of the pivot mechanism illustrated in FIG. 2.

Figure 4:
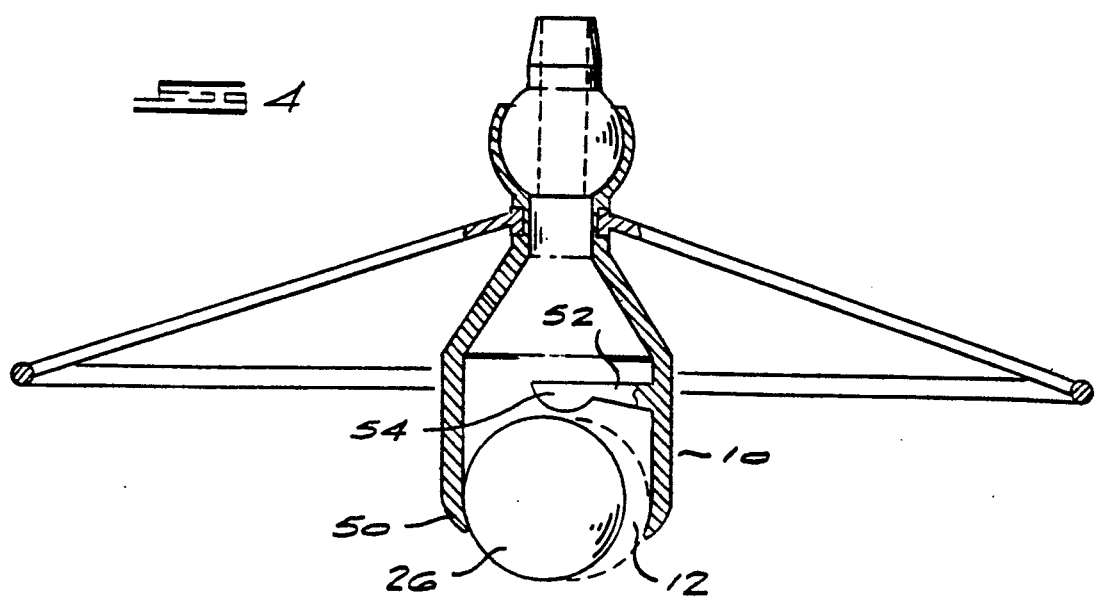
FIG. 4 is a partial sectional view of an alternative embodiment of the cleaner.

A further variation of the cleaner is illustrated in FIG. 4. In this embodiment, the ball 26 is held captive within the inlet 12 by inwardly curved fingers 50 at the periphery of the inlet, and a single radially inwardly extending finger 52 which is formed integrally with the body 10 and which has a rounded tip 54 which engages the ball 26 with minimum friction. The finger 52 prevents the ball 26 from being sucked into the interior of the body 10 in use, while the fingers 50 retain the ball 26 within the body 10 when the pool cleaner is picked up.

In FIG. 3, the pool cleaner is shown fitted with a flexible hood or cowl 56 which is fitted to a circumferential groove in the outer surface of the body 10. The cowl 56 has raised, radially extending ribs 58 on its underside. In use, the periphery of the cowl 56 rests against the submerged surface as the pool cleaner moves across the surface, and accommodates variations in orientation of the cleaner, while maintaining a relatively large cleaning area. The ribs 58 ensure the passage of liquid between the cowl and the submerged surface. Instead of a flexible cowl, a relatively rigid cowl (possibly comprising two or more parts) can be fitted movably to the cleaner body.

Figure 5:
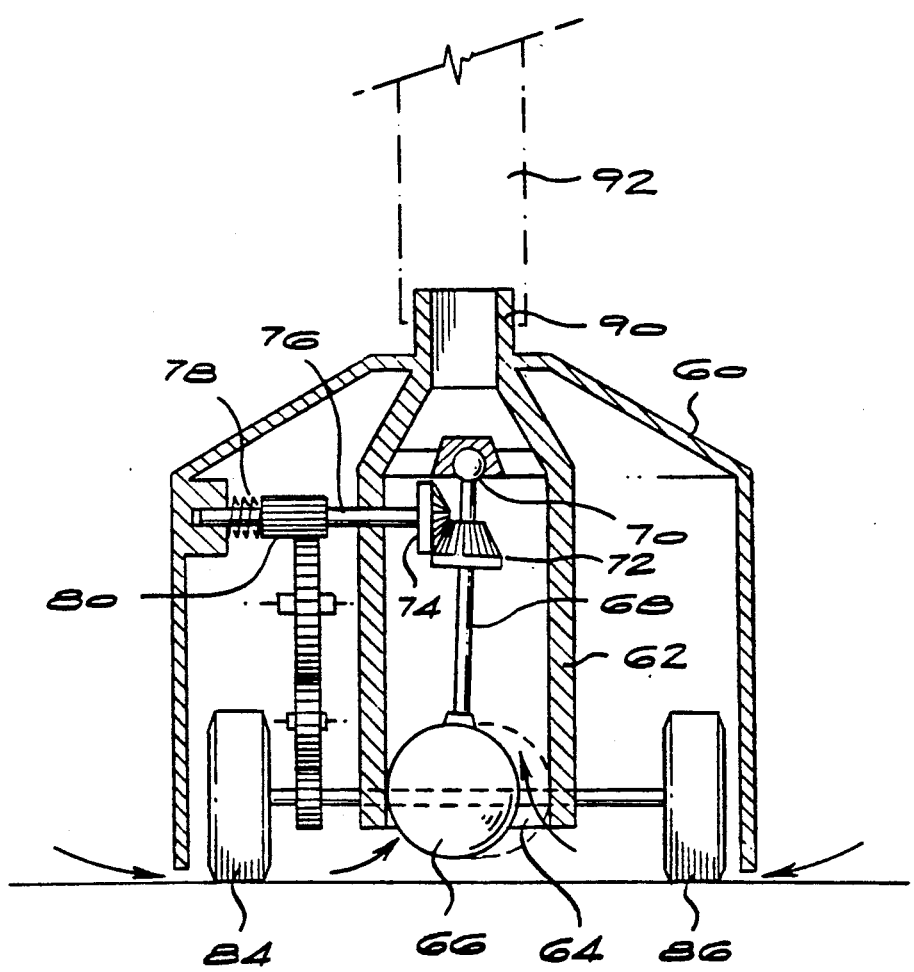
FIG. 5 is a partial sectional view of a further embodiment of the cleaner.

A further variant of the invention is illustrated schematically in FIG. 5. The pool cleaner of FIG. 5 has a body 60 which has a central cylindrical conduit 62 with an inlet 64. Within the inlet 64, a ball 66 is mounted, much as described previously. The ball 66 is fixed to a rod 68, which is supported by a ball and socket-type joint 70, so that the ball 66 and the rod 68 can rotate. A gear 72 is fixed to the shaft and mates with a complemental pinion 74 on a second shaft 76. The shaft 76 is mounted to allow axial movement thereof against the urging of a coil spring 78, which accommodates movement of the gear 72 due to orbital motion of the ball 66 in the inlet 64. A spur gear 80 on the shaft 76 engages a gear train which drives a shaft 82 having wheels 84 and 86, which drive the pool cleaner across the submerged surface 88 in use.

In use, the outlet 90 of the conduit 62 is connected to a flexible hose 92 and liquid is drawn under the periphery of the pool cleaner body and into the inlet in the direction of the arrows. In this embodiment of the invention, the ball 66 acts as a prime mover and drives the wheels 84 and 86 through a transmission, rather than acting as a direct drive element.

A further and currently preferred embodiment of the invention is illustrated in FIGS. 6 to 8. In this case, the pool cleaner 100 has a body 102 with a spigot 104 at its upper end to which is attached a socket member 106 (omitted from FIG. 7). A hose connection spigot 108 is coupled to the upper end of the socket member 106 at a ball and socket type coupling which permits free swivelling movement of the hose connection spigot 108.

At its lower end the body 102 terminates in a round cylindrical inlet 114 in which is located a ball 116. The ball in this embodiment is of hollow pear shape and is made in two parts 116A and 116B which are connected together as indicated at 118. The ball 116 is suspended in freely rotatable fashion on a rod 120. The upper end of the rod 120 passes through a tapered bore in a bush 121 and is supported by a transverse rod 122. The upper end of the rod is held captive by a circlip 124 that engages the rod 120 above the rod 122. The illustrated suspension arrangement allows for free rotation of the ball 116 and for free pivotal movement of the rod 120 relative to the body 102, as indicated in one plane by the arrow 123.

The ball is made of resilient plastics material, promoting a good frictional grip of the ball on a submerged surface. As illustrated in FIG. 8, the lower surface of the ball 116 is formed with a series of striations 126 which further enhance the grip of the ball on the submerged surface.

Extending from the lower extremity of the body 102 is a support structure in the form of a frustoconical cowl 128 terminating at a peripheral, upstanding ridge 130 on which a series of angularly spaced, grooved wheels 132 are rotatably mounted. The grooves of the wheels 132 engage and retain the inwardly directed rib 134 of an annular ring 136 which extends about the periphery of the cowl 128. The wheels 132 allow the ring 136 to rotate freely relative to the cowl. Mounted rotatably to the lower edge of the ring 136 is a series of smaller wheels 138.

The underside of the cowl 128 carries a series of V-shaped ribs 140 that define radially extending passages 142 leading to the inlet 114.

In FIG. 7, the numeral 144 indicates the horizontal bottom of a swimming pool and illustrates the normal orientation of the pool cleaner 100 in use. At this operative orientation, the wheels 138 ride on the bottom 144. The angle 148 is typically 23.5°. Also, the ribs 140 are substantially parallel to the bottom 114 when the pool cleaner is in the operative orientation.

Loose material on the bottom of the pool is sucked into the inlet 114 through the passages 142. Having reached the inlet 114, the material is then sucked away through the body 102 and flexible hose 150 (FIG. 6) as in previous embodiments.

At the same time, differential forces on the periphery of the ball 116, arising as a result of eccentric location of the ball in the inlet, cause it to move in the inlet. The friction between the ball and the bottom 114 causes the pool cleaner 100 to move randomly over the bottom as the orientation of the ball changes in the inlet 114. The ring 136 and wheels 138 prevent dragging of the pool cleaner as it moves over the bottom 114.

Of course, the pool cleaner 100 is not limited to movement over the bottom of the pool. It is equally capable of climbing the submerged walls of a pool to perform a suction cleaning operation there.

It will also be appreciated that none of the embodiments described above is limited in operation to the cleaning of submerged swimming pool surfaces. It is anticipated that the various cleaners could also be used to perform suction cleaning of submerged surfaces other than those of swimming pools.

A major advantage of each of the described embodiments, when compared to known cleaners operating on the interrupted flow principle, is the fact that suction is continuous, so that less wear of the pump can be expected. When compared to known turbine type cleaners, the illustrated embodiments have the advantage of simplicity of construction.

In alternative versions of the invention, the submerged cleaner may operate, not with suction applied by a filtration pump, but with the pressurised return flow of water returning to a swimming pool after filtration. In this case, the return flow is connected to the inlet so as to force the water to flow. Also, it is anticipated that the novel drive principles of the invention can be used in applications other than submerged surface cleaning operations. For instance, the rotational drive produced by the drive element could be used to drive a paddle or the like to perform a cleaning operation on the surface of a body of liquid.

I claim:
1. An hydraulic machine comprising:
  a) a body having a liquid inlet and a liquid outlet and a conduit extending between the inlet and the outlet,
  b) means for moving the body when the liquid flows through the conduit, which body moving means is positioned at least partially within the conduit, with a clearance between it and the interior of the conduit, in a manner permitting its variable eccentric location and continuous rotation relative to the conduit as a result of liquid flow through the conduit, and
  c) means for connecting the body moving means to the body, the conduit being connectable in a liquid flow path so that liquid passing through the conduit applies differential forces to the body moving means resulting in rotation of the body moving means relative to the inlet.

2. An hydraulic machine according to claim 1 wherein the liquid outlet is adapted for connection to a suction source which draws liquid through the inlet, past the body moving means and out of the outlet.

3. An hydraulic machine according to claim 2 wherein the liquid outlet is provided with a swivel connector comprising a socket and a ball having a bore and received by the socket, for connecting the outlet to a hose extending to the suction source.

4. An hydraulic machine according to claim 1 wherein the body moving means is a ball.

5. An hydraulic machine according to claim 4 wherein the body moving means has a shape selected from the group consisting of spheres and pears.

6. An hydraulic machine according to claim 4 wherein the body moving means and conduit have a circular cross-section.

7. An hydraulic machine according to claim 6 wherein the body moving means is smaller in diameter than the conduit and is disposed at least partially within the conduit.

8. An hydraulic machine according to claim 7, wherein the hydraulic machine operates as a submerged surface cleaner and wherein at least a portion of the body moving means extends beyond the conduit so as to engage the submerged surface frictionally in use and so as to drive the body over the submerged surface.

9. An hydraulic machine according to claim 8 and comprising a support structure extending transversely from the body which in use engages the submerged surface.

10. An hydraulic machine according to claim 9 wherein the support structure is of frustoconical shape.

11. An hydraulic machine according to claim 10 wherein the periphery of the support structure carries a ring which is rotatable relative to the support structure.

12. An hydraulic machine according to claim 11 wherein the ring carries rotatable wheels spaced about and connected to the operatively lower edge thereof.

13. An hydraulic machine according to claim 11 wherein the ring is supported relative to the support structure by rotatable wheels carried by the periphery of the support structure.

14. An hydraulic machine according to claim 1 comprising an annular support ring surrounding the body and connected to the body by a spoked hub.

15. An hydraulic machine according to claim 1 wherein the machine operates as a submerged surface cleaner and wherein the body moving means is connected via transmission means to a secondary drive element which in use engages the submerged surface to drive the machine over the submerged surface when the body moving means rotates.

16. An hydraulic machine according to claim 15 wherein the transmission means includes a gear train adapted to drive the secondary drive element in the form of wheels that engage the submerged surface in use.

17. An hydraulic machine comprising:
a) a body defining:
  i) an inlet having a diameter;
  ii) an outlet; and
  iii) a conduit intermediate the inlet and the outlet adapted to permit fluid flow through the body;
b) means, comprising a drive element having a diameter less than the diameter of the inlet, for moving the body; and
c) means, connected to the body and comprising a shaft extending along the conduit connected to the drive element, for suspending the drive element at least partially within the inlet so as to permit continuous rotation of the drive element about the shaft as a direct result of fluid flow through the inlet and body.

18. An hydraulic machine according to claim 17 in which the suspending means further comprises:
a) a bracket attached to the shaft; and
b) a rod connected to the body and passing freely through the bracket.

19. An hydraulic machine according to claim 18 in which the body defines an external surface having a groove and further comprising a rotatable, spoked support ring received by the groove.

20. An hydraulic machine according to claim 19 in which the outlet defines a socket and further comprising a ball received by the socket.

21. An hydraulic machine according to claim 20 in which the ball defines a bore for permitting fluid flow therethrough and further comprising a spigot integrally formed with the ball and adapted for attachment to a flexible hose.

* * * * *